United States Patent [19]

Ebihara

[11] 4,242,705
[45] Dec. 30, 1980

[54] NOISE REDUCTION SYSTEM FOR VIDEO SIGNALS

[75] Inventor: Norio Ebihara, Yokohama, Japan

[73] Assignee: Sony Corporation, Tokyo, Japan

[21] Appl. No.: 77,174

[22] Filed: Sep. 20, 1979

[30] Foreign Application Priority Data

Sep. 21, 1978 [JP] Japan .................................. 53/116349
Nov. 15, 1978 [JP] Japan .................................. 53/140673

[51] Int. Cl.³ ............................................. H04N 5/21
[52] U.S. Cl. ........................................ 358/167; 358/36
[58] Field of Search ................. 358/167, 135, 136, 36, 358/105, 8, 37

[56] References Cited

U.S. PATENT DOCUMENTS

| | | | |
|---|---|---|---|
| 3,962,535 | 6/1976 | Haskell | 358/136 |
| 4,047,221 | 9/1977 | Yasuda | 358/136 |
| 4,064,530 | 12/1977 | Kaiser et al. | 358/36 |
| 4,077,053 | 2/1978 | Ishiguro | 358/136 |
| 4,107,739 | 8/1978 | Rossi | 358/167 |
| 4,163,258 | 7/1979 | Ebihara | 358/167 |
| 4,194,219 | 3/1980 | Drewery | 358/167 |

FOREIGN PATENT DOCUMENTS

| | | | |
|---|---|---|---|
| 1515551 | 6/1978 | United Kingdom | 358/167 |
| 2015294 | 9/1979 | United Kingdom | 358/36 |
| 2020508 | 11/1979 | United Kingdom | 358/36 |
| 2020941 | 11/1979 | United Kingdom | 358/167 |

Primary Examiner—Robert L. Griffin
Assistant Examiner—Michael A. Masinick
Attorney, Agent, or Firm—Lewis H. Eslinger; Alvin Sinderbrand

[57] ABSTRACT

A recursive noise reduction system for a television system uses the spatial correlation in a frame difference signal derived by element-by-element subtraction of an incoming video signal from corresponding picture elements of a relatively noise-free stored video signal to redue noise in a video signal. The spatial correlation is used to suppress the components of the frame difference signal which are due to frame-to-frame changes in the video resulting from motion in the scene, thus producing a signal which contains substantially only the noise in the incoming video. The noise signal thus derived is subtracted from the incoming video signal to produce a noise-reduced output signal for display or recording. The noise-reduced output signal and the incoming video are added together in varying proportions according to the amount of scene-to-scene motion detected and the sum is stored for use in subsequent treatment of new incoming video.

28 Claims, 42 Drawing Figures

FIG. 10B 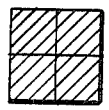   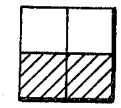 FIG. 10D
FIG. 10C 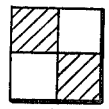   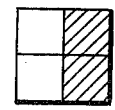 FIG. 10E
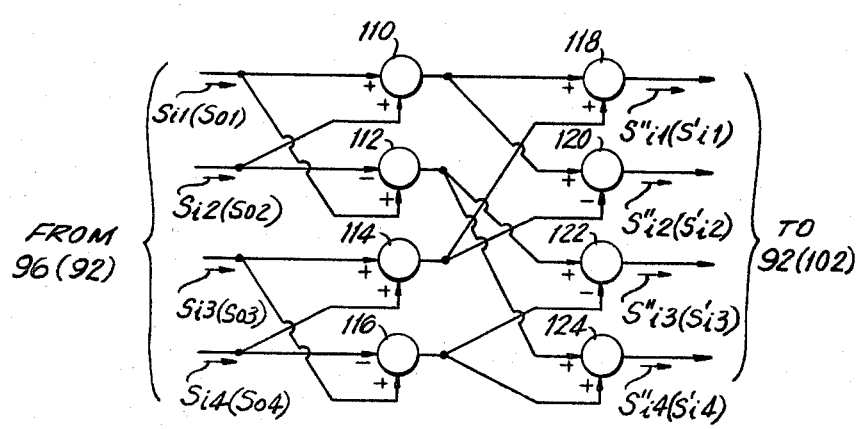
FIG. 11

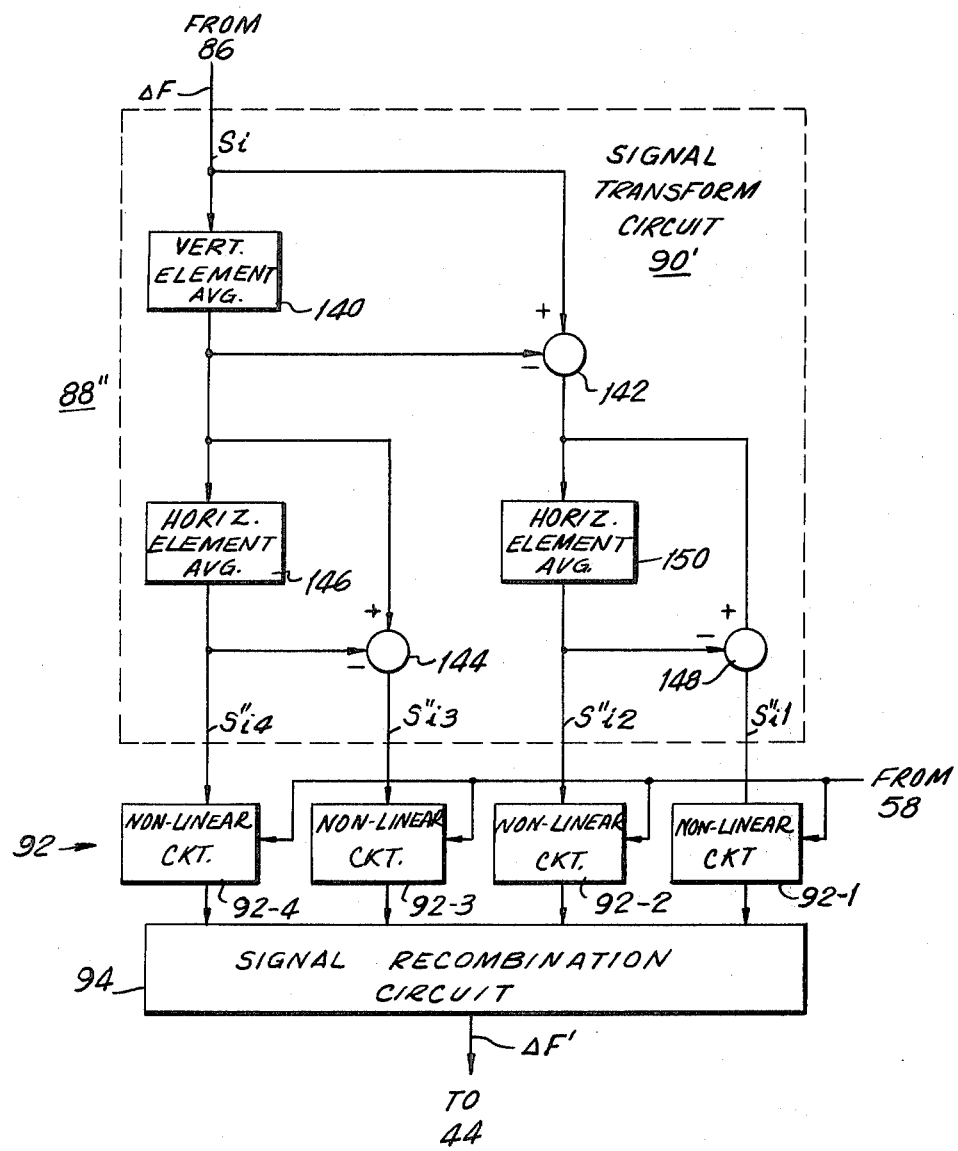

NOISE REDUCTION SYSTEM FOR VIDEO SIGNALS

BACKGROUND OF THE INVENTION

The present invention relates to noise reduction systems for television systems in which use is made of integration of video from preceding frames to reduce the noise in the video signal.

The signal content of a video signal is strongly correlated from frame to frame whereas the noise content of of a video signal is uncorrelated. This difference between video signal and noise has been used to reduce noise in a displayed picture. In U.S. Pat. No. 4,064,530, a frame store, capable of storing an entire frame of television video, subtracts digital signals representing corresponding picture elements of stored video and new video to determine the proportion of new video to be mixed with recirculated old video in the frame memory. In a substantially stationary picture (zero motion), a high proportion of recirculated video from the memory is restored therein accompanied by a small proportion of new video. When comparison of corresponding picture elements indicates a substantial difference therebetween (presumably resulting from motion in the scene), a greater proportion of new video and a smaller proportion of recirculated video is stored for that picture element in the frame memory. This system has the disadvantage that the incoming new video is directly mixed with the previously stored video signal and the effective component of the new video may be eliminated therefrom together with the noise component when there is only a small amount of difference between subsequent frames of the video signal. In addition, since the noise component itself never appears as a separate signal, this system requires two sets of circuits for controlling the mixture of new and recirculated video and suffers from the difficulty of operating two such circuits in a completely balanced manner.

OBJECTS AND SUMMARY OF THE INVENTION

Accordingly, it is an object of the present invention to provide a noise reduction system for a television system which avoids the disadvantages of the prior art.

It is a further object of the present invention to provide a noise reduction system in which a noise-reduced stored video signal from preceding frames is employed to separate the noise included in a new video signal from the remainder thereof, the separated noise is then subtracted from the new video signal to produce a noise-reduced signal.

It is a still further object of the present invention to provide a noise reduction system employing the element-by-element difference between incoming video and a noise-reduced stored video to produce a frame-difference signal which, in a scene without motion, represents only noise in the incoming signal, a video-suppression circuit is provided to suppress video components in a frame difference signal arising from motion between frames and to thus provide a relatively pure noise signal for subtraction from the incoming video.

According to an aspect of the invention, there is provided a noise reduction system for reducing noise in a video signal which consists of a successive plurality of frames occurring at frame intervals, comprising means for storing the video signal from at least one frame for an integral multiple of the frame intervals, means for mixing corresponding elements of a new frame of the video signal with the video signal stored in the means for storing to produce a frame difference signal, means for transforming the frame difference signal into a plurality of video signal components, means for respectively controlling the plurality of video signal components whereby a predetermined characteristic of at least one of the plurality of video signal components is modified, means for recombining the plurality of video signal components including each said modified one thereof into a corrected frame difference signal, and means for combining the corrected frame difference signal with the new frame of the video signal to obtain a noise-reduced video signal.

The above, and other objects, features and advantages of the present invention will become apparent from the following description read in conjunction with the accompanying drawings in which like reference numerals designate the same elements.

BRIEF DESCRIPTION OF THE DRAWINGS

FIGS. 10B–10E show the possible video patterns which may be sensed in the video suppression circuit of FIG. 8;

FIG. 11 is a block diagram of a Hadamard transform circuit suitable for use in the video suppression circuit of FIG. 8;

FIG. 17 is a block diagram of a video suppression circuit including a variation of a signal transform circuit suitable for use in the embodiment of FIG. 7;

DETAILED DESCRIPTION OF THE PREFERRED EMBODIMENT

Figure 1:
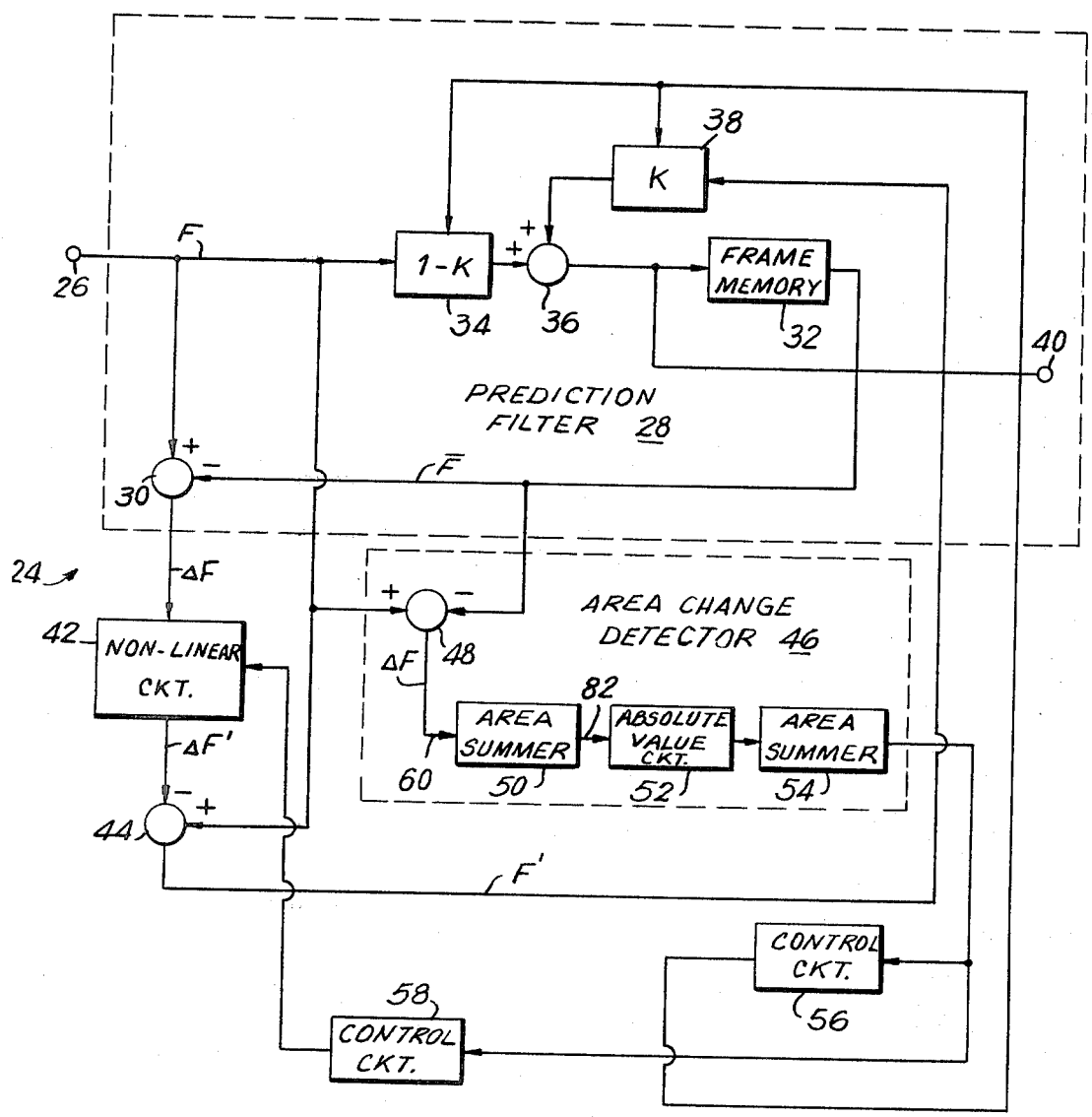
FIG. 1 is a block diagram of a noise reduction circuit suitable for use with the present invention.

Referring now to FIG. 1, there is shown, generally at 24, a noise reduction circuit to which the present invention may be applied. Noise reduction circuit 24 may be analog or digital but, in the preferred embodiment, digital processing is performed in order to take advantage of the precision of digital circuits in delay and arithmetic operations. The following description, although directed toward a digital embodiment, would be readily understood by one skilled in the art to also apply to an analog apparatus.

A video signal is sampled by external equipment (not shown) at equal sampling intervals T. The existing analog values are converted to digital numbers representing new video F which are applied to an input terminal 26. In the preferred embodiment, sampling intervals T occur at a rate equal to four times the color subcarrier frequency (3.58 MHz) in a color television signal and are digitized into an 8-bit digital number. The digitized new video F is applied to a prediction filter 28 having a subtractor 30 in which stored, relatively noise-free, video $\bar{F}$ is subtracted element-by-element from the incoming new video F to produce a frame difference signal $\Delta F$. A frame memory 32 contains stored video $\bar{F}$ and receives for storage a proportion of the new video F which is mixed with a noise-reduced video F' in preparation for subsequent incoming frames of new video. The new video F is applied through a variable attenuator 34 having an attenuation of 1-K to an input of an adder 36. Noise-reduced video F', generated in a manner which will be described hereinafter, is applied through a variable attenuator 38 having an attenuation K to the second input of adder 36. The output of adder 36 is applied to output terminal 40 for use in the television system as well as to the input of frame memory 32 for storage therein.

An area change detector 46 controls the control factor K according to the amount of frame-to-frame change in an area of the video in the vicinity of the elements of new video F and stored video $\bar{F}$ being processed. If the successive frames of new video F have no moving components therein, new video F and stored video $\bar{F}$ should be identical except for the noise content of the new video. Consequently, frame difference signal $\Delta F$ from subtractor 30 in prediction filter 28 should contain only noise and no video signal. Under such circumstances the control factor K of variable attenuators 34 and 38 is increased by area change detector 46 in order to store more of the noise reduced video F' and less of the incoming new video F.

When motion in the scene occurs between frames of the video, portions of the new video F are different from the stored video $\bar{F}$, particularly in the boundary regions of a moving image. Under this circumstance, frame difference signal $\Delta F$ contains not only the noise in the new video signal F, but also a video content representative of the frame-to-frame change between the new video F and the stored video $\bar{F}$. The control factor K for prediction filter 28 is therefore changed to make frame memory 32 more responsive to incoming new video F and less responsive to noise-reduced video F' in order to permit the necessary rapid change in the content of frame memory 32 in the areas of the scene which have changed in the new frame relative to preceding frames.

A non-linear circuit 42 is employed to at least partially remove the video from frame difference signal $\Delta F$ so that a resulting corrected frame difference signal $\Delta F'$ substantially represents the noise in the new video F with the scene-change video component removed. Corrected frame difference signal $\Delta F'$ is applied to the subtracting input of a subtractor 44 where it is subtracted from the new video F which is applied to the plus input thereof. The output of subtractor 44 is a noise-reduced video F' which is applied to a signal input of variable attenuator 38.

Area change detector 46 combines frame difference signals from a number of sampling intervals T in the vicinity of the video from the sampling interval being processed to determine whether motion is occurring near the point being processed and thus to control the control factor K and the characteristics of non-linear circuit 42. New video F and stored video $\bar{F}$ are applied to plus and minus terminals respectively of a subtractor 48 to produce a frame difference signal $\Delta F$ which is the same as the frame difference signal produced by subtractor 30. Frame difference signal $\Delta F$ is applied to an area summer 50 which applies appropriate delays to frame difference signal $\Delta F$ and sums the results to produce an output signal which is responsive to video in an area of the scene which is suitably three lines high by four sampling intervals wide. Area summer 50 produces a signal which is responsive primarily to motion in the video scene and relatively non-responsive to noise. This results from the fact that a video component in frame difference signal $\Delta F$ is strongly corelated between adjacent points whereas noise is relatively uncorelated. The summed signal from area summer 50 is applied to an input of an absolute value circuit 52 which produces an output signal representing the absolute value of its input. In the preferred embodiment, absolute value circuit 52 is a full-wave rectifier which produces a positive output proportional to either a positive or negative input. The output from absolute value circuit 52 is applied to a second area summer 54 which may be identical to area summer 50 and which further processes the signal to determine change in the area of the scene. The output of area summer 54 is applied to inputs of control circuits 56 and 58. Control circuit 56 controls the value of control factor K which is applied to variable attenuators 34 and 38 in inverse proportion to the amount of motion detected by area change detector 46. Control circuit 56 applies a control signal to an input of non-linear circuit 42 which changes the threshold or slope of the response of non-linear circuit 42.

Figure 2:
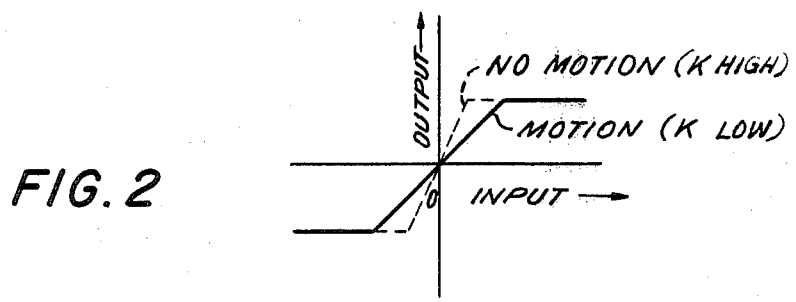
FIG. 2 is a graph showing the relationships between the input and output of a non-linear circuit of FIG. 1.

Referring now to FIG. 2, the input and output relationships of non-linear circuit 42 for detected motion or lack thereof in frame difference signal $\Delta F$ are shown. A solid-line curve indicates the response of non-linear circuit 42 when motion is detected and a dashed-lined curve shows the response when motion is not present. Thus, non-linear circuit 42 enhances the signal in the presence of noise alone and suppresses the signal in the presence of motion within the area. Non-linear circuit 42 may be provided with other response characteristics by one skilled in the art, including the characteristics of coring and stripping circuits. A coring circuit is one in which the output remains at zero until a positive or negative threshold is exceeded and is linearly related to the input therebeyond. A stripping circuit is one in which the output goes to zero when a positive or negative threshold is exceeded and is linearly related to the input below the threshold.

Figure 3:
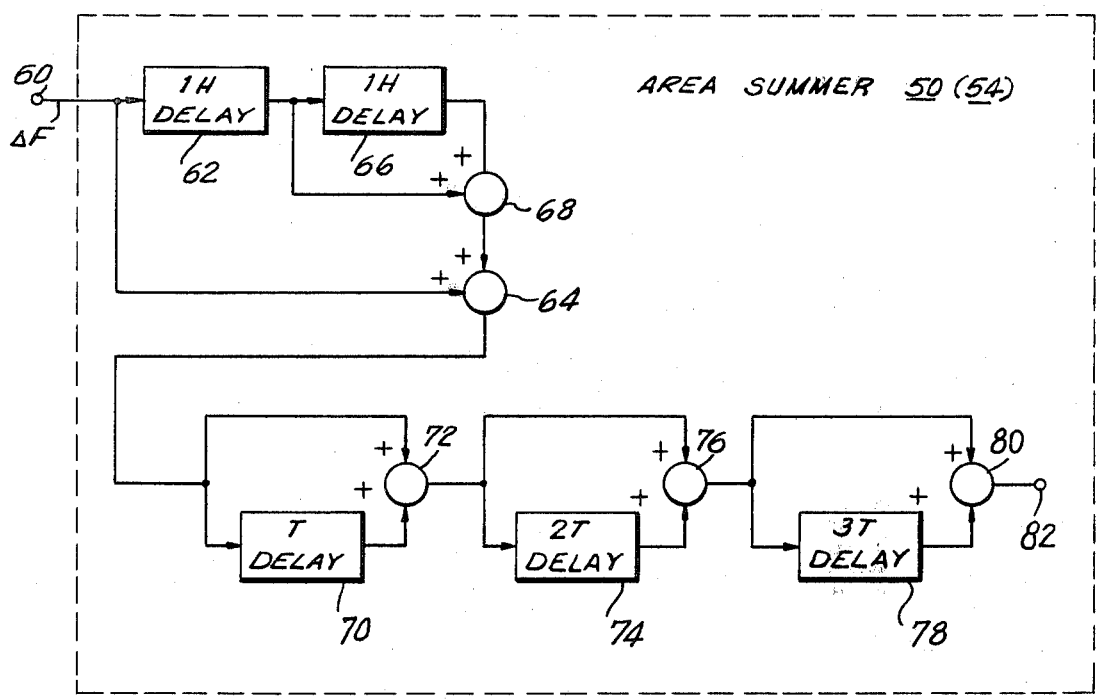
FIG. 3 is a block diagram of an area summer suitable for use in the apparatus of FIG. 1.

Referring now to FIG. 3, a circuit suitable for area summer 50 (or 54) is shown. Frame difference signal $\Delta F$ is applied through terminal 60 to a delay circuit 62, having a delay of one horizontal interval H, and to an input of an adder 64. The output of delay circuit 62 is applied to an input of a delay circuit 66 having a delay of one horizontal interval H and to an input of an adder 68. The output of delay circuit 66 is applied to a second input of adder 68 and the summed output therefrom is applied to a second input of adder 64. The output of adder 64 consequently contains the summed frame difference signals $\Delta F$ existing corresponding to the video currently being processed as well as frame difference signals $\Delta F$ from corresponding positions in the two preceding lines in the frame. The summed output of adder 64 is applied to an input of a delay circuit 70 having a delay of one sampling interval T and to an input of an adder 72. The output of adder 72 is applied to a delay circuit 74 having a delay of 2T and to an adder 76. The output of adder 76 is applied to a delay circuit 78 having a delay of 3T and to an adder 80. The output of adder 80 is applied to an output terminal 82 which is, in turn, connected to an input of absolute value circuit 52 (FIG. 1) in the case of area summer 50 or to control circuits 56 and 58 in the case of area summer 54.

Area summers 50 and 54 have a transmission function give by the equation:

$$G(Z) = (1+Z^{-h}+Z^{-2h})\cdot(1+Z^{-1})\cdot(1+Z^{-2})\cdot(1+Z^{-3})$$

in which $Z = e^{jwT}$ where w is an angular frequency of the sampling signal, and h is a value obtained by dividing the horizontal interval H by sampling interval T.

Figure 4A:
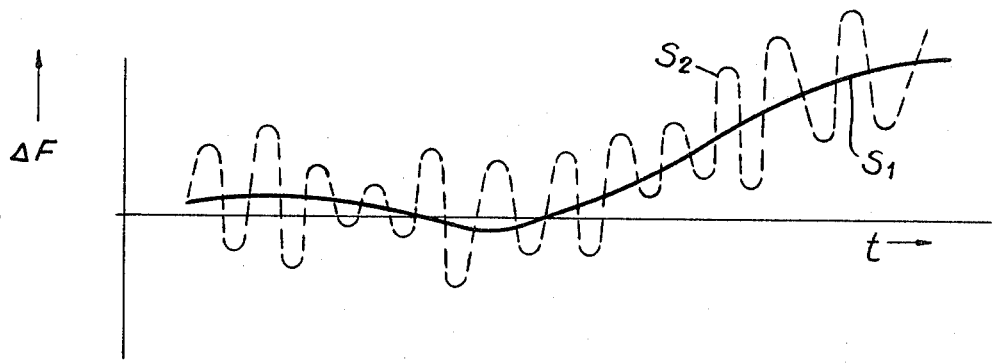
FIGS. 4A–4D are waveforms to which reference will be made in describing the operation of an area change detector of FIG. 1.
Figure 4B:
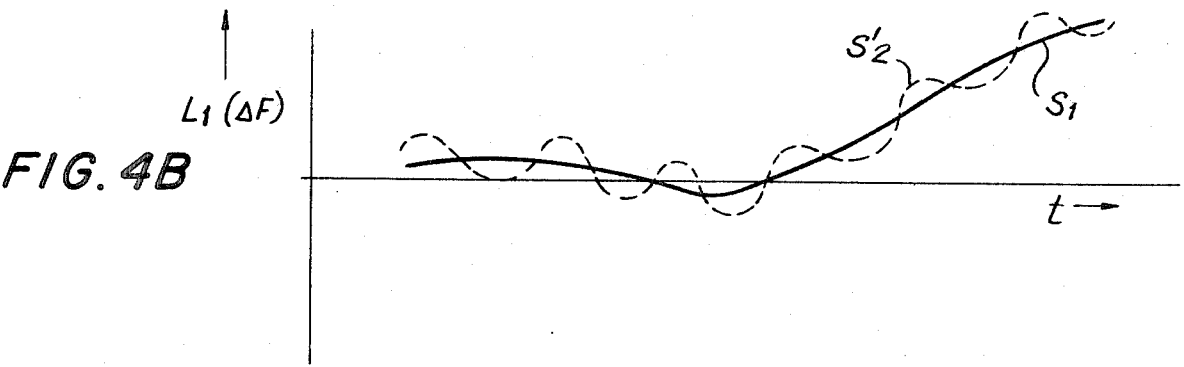
Figure 4C:
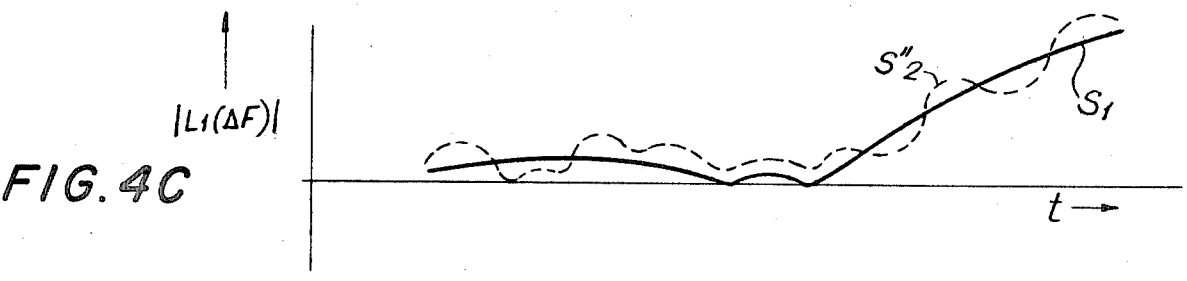
Figure 4D:
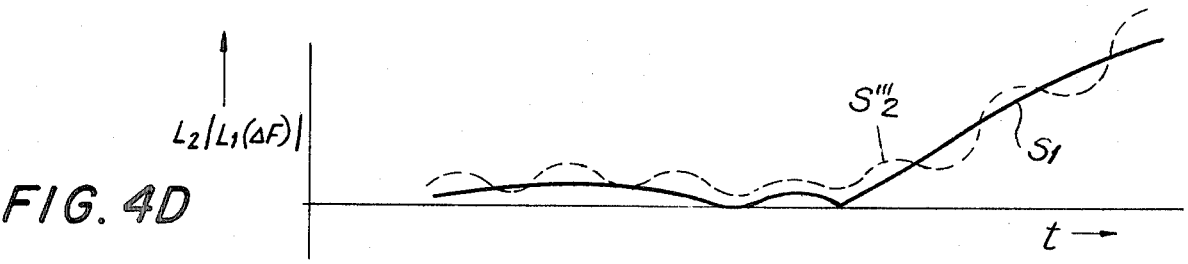

Referring now to FIGS. 4A-4D, the operation of area change detector 46 is described. As shown in FIG. 4A, frame difference signal $\Delta F$ includes a component $S_1$, shown in solid line in FIG. 4A, due to the video in the new and stored frames and a superimposed noise component $S_2$, shown in dashed line, due to the noise on the incoming video F. When the video is stationary (not including motion) the video component is near zero as shown to the left of FIG. 4A. When there is motion between frames, video component $S_1$ goes either positive and negative from the axis. As shown in FIG. 4B, after being summed in area summer 50 to produce a smoothed output $L_1 (\Delta F)$, as shown in FIG. 4B, the amplitude and frequency of the remaining noise component $S_2'$ are both reduced. As shown in FIG. 4C, after passing through absolute value circuit 52, the negative-going excursions have been inverted to positive going excursions. As shown in FIG. 4D, the output signal $L_2|L_1 (\Delta F)|$ still contains the video component $S_1$ representing actual motion in the video as well as a reduced amplitude low frequency noise component $S_3'''$. It should be noted that the sum of the two components shown in FIG. 4D are a reasonable approximation of the video signal $S_1$ alone in FIG. 4A. In particular, all high frequency and pulse-type noise characteristics originally appearing in noise component $S_2$ in FIG. 4A have been removed in the output shown in FIG. 4D. Consequently, the output shown in FIG. 4D is a good representation of changes in the area being treated due to motion in the scene.

Figure 5:
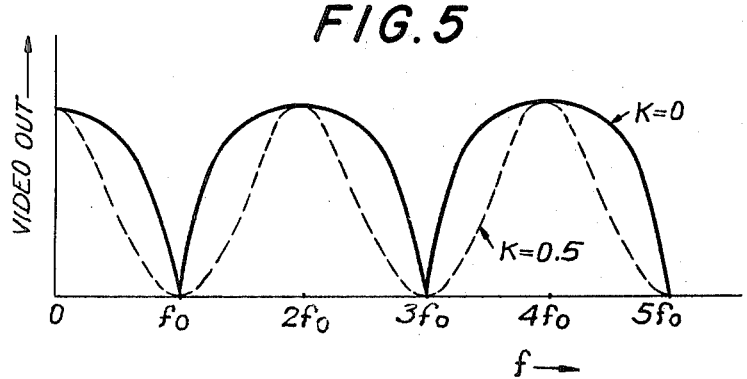
FIG. 5 is a graph showing video output versus frequency for an equivalent comb filter represented by the circuit of FIG. 1.

As the control factor K (FIG. 1) controlling the proportional input to frame memory 32 is changed in response to the output of area change detector 46, the circuit performs similarly to a C-type comb filter having variable width tines. The delay experienced by the video signal leaving subtractor 44 is, of course, different from a real comb filter. As shown in FIG. 5, the video information is clustered around even harmonics of the frame frequency of 30 $H_Z$ ($2nf_0$ where $f_0$ equals 30 $H_Z$). The video is zero at odd harmonics of the frame frequency $(2n-1)f_0$. In a still picture, the video is narrowly clustered around the even harmonics of the frame frequency whereas in a moving picture, the video is more widely spread therefrom toward adjacent odd harmonics. When control factor K is large, for example K=0.5, indicating little motion in the area being treated by area change detector 46, the response of the equivalent comb filter is narrowed toward the even harmonics as shown by the dashed line curve in FIG. 5. Conversely, when area change detector 46 detects substantial motion in the area being treated, control factor K may be set to zero resulting in the broader response curve shown in solid line in FIG. 5.

Since noise occurs uniformly across the spectrum, it is clear that the dashed line curve in FIG. 5 permits the system to respond to considerably less of the randomly occurring noise than does the solid line curve. When the control factor K is increased closer to 1, the equivalent tines of the equivalent comb filter become even narrower to even further reject noise while still being capable of encompassing the entire video content of a stationary scene which has its video clustered close to even harmonics of the frame frequency.

Figure 6:
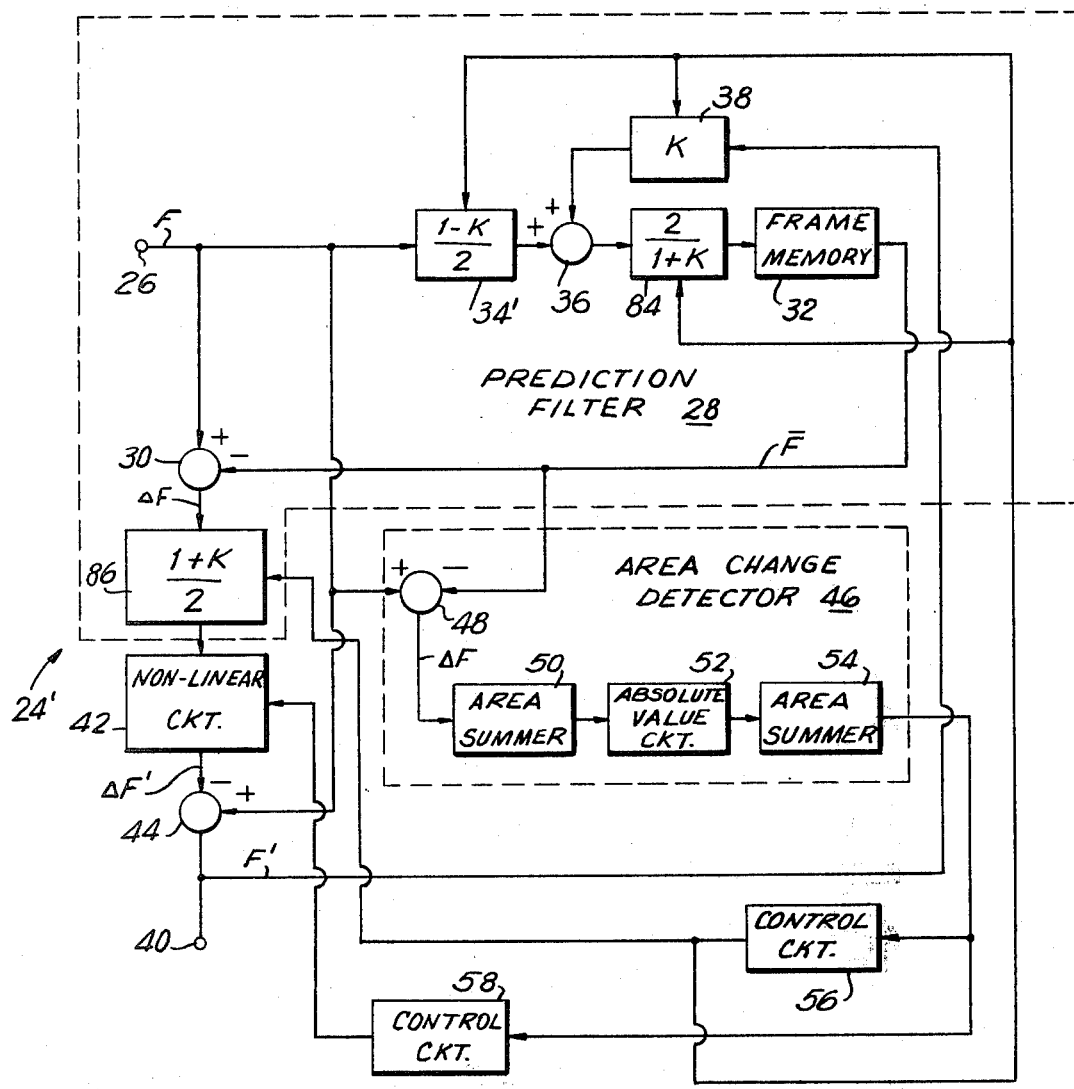
FIG. 6 is a block diagram of another noise reduction circuit suitable for use with the present invention.

Referring now to FIG. 6, another noise reduction circuit 24' to which the present invention may be applied is shown. Noise reduction circuit 24' is the same as noise reduction circuit 24 shown in FIG. 1 except for the addition of an amplifier 84, having an amplification factor of $$\frac{2}{(1+K)},$$

between adder 36 and frame memory 32 and an attenuator 86 having an attenuation of $$\frac{(1+K)}{2}$$

between subtractor 30 and non-linear circuit 42 and a change in the attenuation factor of variable attenuator 34' to $$\frac{(1-K)}{2}.$$

The output to output terminal 40 is taken directly from subtractor 44. It will be noted that the extra gain provided by amplifier 84 of $$\frac{2}{(1+K)}$$

is compensated by the additional attenuation provided by attenuator 86 having an attenuation factor $$\frac{(1+K)}{2}.$$

Although the noise reduction circuits of FIGS. 1 and 6 have been described with a prediction filter which develops a frame difference signal $\Delta$ F by subtracting new video F from one-frame-delayed video $\bar{F}$ stored in frame memory 32, longer delays equal to an integral multiple of one frame may be employed. When longer delays are used, the systems respond relatively slowly to motion. Consequently, for normal television signals it is preferred to use only a single frame delay in frame memory 32 for producing frame difference signal $\Delta$ F.

In the noise reduction circuits 24, 24' shown in FIGS. 1 and 6, frame difference signals $\Delta$ F are applied to non-linear circuit 42 regardless of the nature of the input video signal F. If the input video signal F contains only a weak video component having an amplitude close to or within the noise, non-linear circuit 42 is capable of eliminating the video component along with noise. This results in degraded resolution of the video signal.

Figure 7:
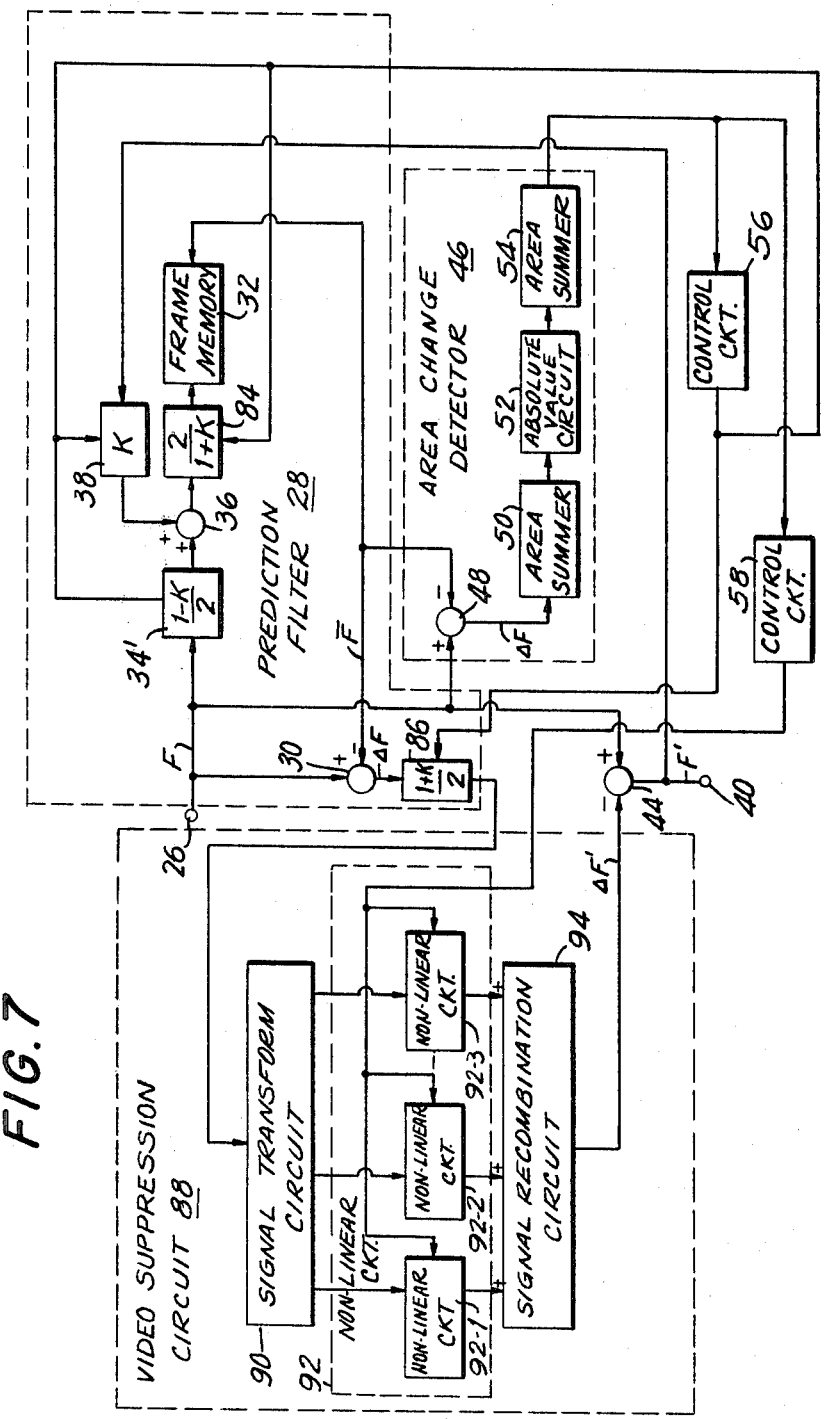
FIG. 7 is a block diagram of a noise reduction circuit according to an embodiment of the present invention.

Referring now to FIG. 7, there is shown an embodiment of the invention which overcomes the above-mentioned drawbacks by suppressing components of frame difference signal $\Delta$ F which are due to motion-induced change in the video to produce a noise signal which is then subtracted from the incoming new video F. A video suppression circuit 88 is substituted for the non-linear circuit 42 shown in FIGS. 1 and 6. The remainder of circuits in FIG. 7 are identical to those in FIG. 6 and will not be further described.

Frame difference signal $\Delta$ F, attenuated in attenuator 86, is applied to an input of a signal transform circuit 90 which separates different spatial frequency components from frame difference signal $\Delta$ F and applies the separated frequency components to a non-linear circuit assembly 92 containing non-linear circuits 92-1 through 92-N. A threshold level in each non-linear circuit 92-1 through 92-N is controlled by a control signal from control circuit 58 as previously described. Non-linear circuits 92-1 through 92-N may be limiter circuits having input/output characteristics as shown in FIG. 2 or may be stripping circuits in which the output drops to zero when a positive or negative threshold level is exceeded. Signal transform circuit 90 responds strongly to video spatial correlation in frame difference signal $\Delta$ F. Upon passing through the appropriate non-linear circuit 92-1 through 92-N, such strong signals are eliminated thus leaving only noise signals for applications to a signal recombination circuit 94. Signal recombination circuit 94 reconstitutes the corrected frame difference signal $\Delta$ F' which is the same as frame difference signal $\Delta$F except for the absence of spatially correlated components. Thus, corrected frame difference signal $\Delta$F' contains substantially only the noise component present in new video F. Corrected frame difference signal $\Delta$F' is applied to the subtracting input of subtractor 44 which also receives the new video signal F at its adding input. The noise-reduced video F' from subtractor 44 is applied to output terminal 40 and to an input of variable attenuator 38 as previously described.

Signal transform circuit 90 may be any convenient transform circuit capable of separately responding to spatial components in the signal. Such a function may be performed by a Hadamard, Walsh, Haar or other orthogonal transform circuit. In the preferred embodiment, a Hadamard transform circuit is employed in signal transform circuit 90. In addition, an identical Hadamard transform circuit is used in signal recombination circuit 94.

Before describing signal transform circuit 90 and signal recombination circuit 94, the following discussion of orthongonal transformation and reverse transformation is provided to give the background necessary for understanding the description of the apparatus.

If a block of an input video signal row is designated $\vec{X}$, a block of an output video signal row is designated $\vec{Y}$, an orthogonal transform matrix is designated A, and a reverse orthogonal transform matrix is designated B, then the following formulae are given:

$$\left.\begin{array}{c}\vec{Y}=A\vec{X}\\ \vec{X}=B\vec{Y}\end{array}\right\} \quad (1)$$

$$B=A^T \quad (2)$$

(where $A^T$ is a transposed matrix)

$$\left.\begin{array}{c}\vec{X}=(x_1, x_2 \ldots x_n)\\ \vec{Y}=(y_1, y_2 \ldots y_n)\end{array}\right\} \quad (3)$$

$$A=\begin{pmatrix} a_{11} & a_{12} & \cdots & a_{1n}\\ a_{21} & a_{22} & \cdots & a_{2n}\\ \cdot & \cdot & & \cdot\\ \cdot & \cdot & & \cdot\\ \cdot & \cdot & & \cdot\\ a_{n1} & a_{n2} & \cdots & a_{nn} \end{pmatrix} \quad (4)$$

$$B = \begin{pmatrix} b_{11} & b_{12} & \cdots & b_{1n} \\ b_{21} & b_{22} & \cdots & b_{2n} \\ \vdots & \vdots & & \vdots \\ b_{n1} & b_{n2} & \cdots & b_{nn} \end{pmatrix} \quad (5)$$

The input signal is subjected to the orthogonal transformation, then $$\left.\begin{aligned} y_1 &= a_{11}x_1 + a_{12}x_2 + \cdots + a_{1n}x_n \\ y_2 &= a_{21}x_1 + a_{22}x_2 + \cdots + a_{2n}x_n \\ &\vdots \\ y_n &= a_{n1}x_1 + a_{n2}x_2 + \cdots + a_{nn}x_n \end{aligned}\right\} \quad (6)$$

The reverse orthogonal transform output is given by $$\left.\begin{aligned} x_1 &= b_{11}y_1 + b_{12}y_2 + \cdots + b_{1n}y_n \\ &\vdots \\ x_n &= b_{n1}y_1 + b_{n2}y_2 + \cdots + b_{nn}y_n \end{aligned}\right\} \quad (7)$$

As a result, the transform coefficient, that is, the orthogonal transform output Y provides first degree coupling between a row vector and the input signals.

Figure 8:
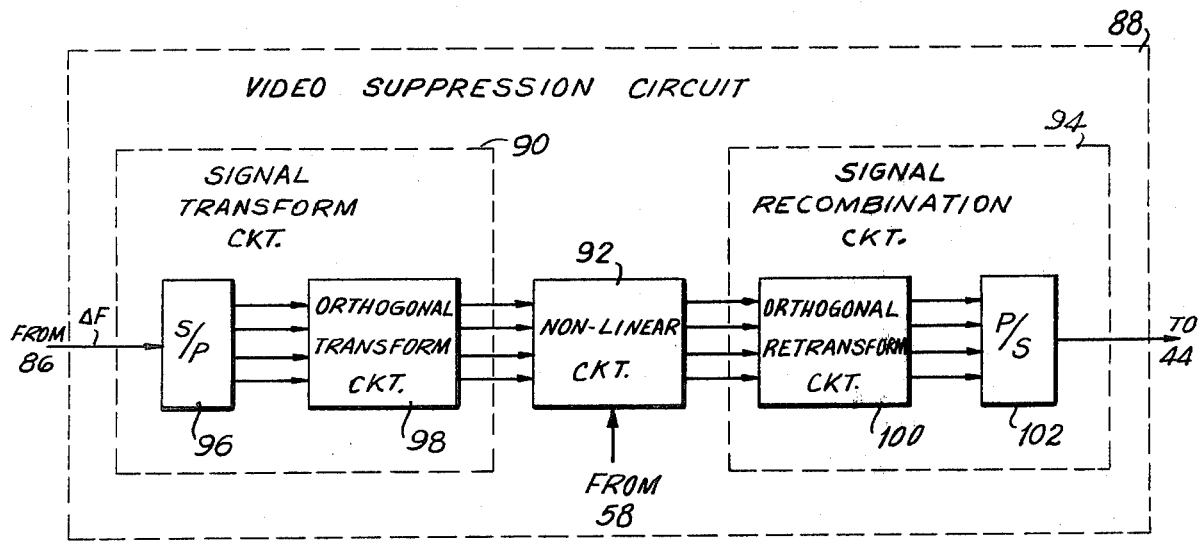
FIG. 8 is a block diagram of a video suppression circuit suitable for use in the noise reduction circuit of FIG. 7.

Referring now to FIG. 8, there is shown an embodiment of video supression circuit 88 using Hadamard transform circuits. Frame difference signal ΔF from attenuator 86 is applied to a serial/parallel converter 96 in signal transform circuit 90. Serial/parallel converter 96 provides a plurality of parallel samples of frame difference signal ΔF to an orthogonal transform circuit 98. Orthogonal transform circuit 98 separates the spatial frequency components of its plurality of inputs and applies them on separate lines to non-linear circuit assembly 92. Non-linear circuit assembly 92 suppresses those components of its input which result from video contained in frame difference signal ΔF as previously described. The resulting output signals from non-linear circuit assembly 92, containing substantially only the noise components of frame difference signal ΔF are applied to an input of an orthogonal retransform circuit 100 which retransforms the frequency-domain signals from non-linear circuit assembly 92 into a plurality of time-domain signals which are applied to parallel/serial converter 102.

Figure 9:
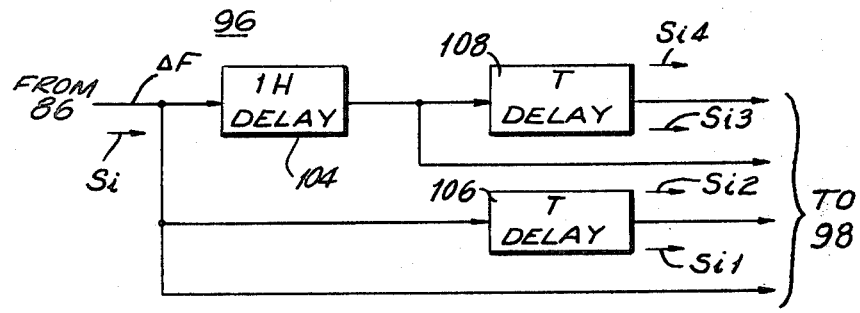
FIG. 9 is a block diagram of a serial/parallel converter suitable for use in the video suppression circuit of FIG. 8.

Referring now to FIG. 9, there is shown an embodiment of serial/parallel converter 96. Frame differnce signal ΔF, also identified as signal $S_i$, from attenuator 86 is applied in parallel to inputs of a delay circuit 104, having a delay of one horizontal interval H, a delay circuit 106, having a delay of one sampling interval T, and directly to an input of orthogonal transform circuit 98. The output of delay circuit 104 is applied to an input of a delay circuit 108, having a delay of one sampling interval T, and to an input of orthogonal transform circuit 98. Outputs of delay circuits 106 and 108 are also applied to inputs of orthogonal transform circuit 98. As can be seen in the drawing, the outputs from serial/parallel converter 96 have applied to them delays of zero ($S_{i1}$), one sampling interval T ($S_{i2}$), one horizontal interval H ($S_{i3}$), and one horizontal interval H pluse one sampling interval T ($S_{i4}$).

Figure 10A:
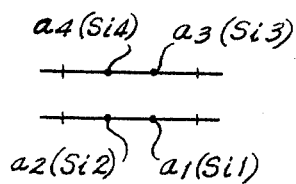
FIG. 10A is a drawing of two adjacent field lines of a television display showing two contiguous sampling points on each line whose video may be simultaneously provided by the serial/parallel converter of FIG. 9.

Referring now to FIG. 10A, it will be seen that outputs $S_{i1}$-$S_{i4}$ of FIG. 9 represent frame difference signal ΔF at points $a_1$ and $a_2$ spaced apart on a first television line and points $a_3$ and $a_4$ spaced apart on a second television line. Thus, points $a_1$-$a_4$ represent the video content lof an area on a television screen (not shown). If only noise is present in frame difference signal ΔF, indicating that no video change has occurred from frame to frame in the area defined by points $a_1$-$a_4$, the signal at these points will be essentially random. However, if a video change has occurred from frame to frame, strong correlation between points in the defined area mayh be detected.

FIGS. 10B-10E show the types of video patterns which may be detected in the area defined by points $a_1$-$a_4$. Cross hatching indicates brightness and lack of cross hatching indicates darkness in the displayed video signal. FIG. 10B illustrates a completely bright area. FIG. 10C indicates diagonal areas bright and dark. FIG. 10D shows horizontal dark and bright stripes. FIG. 10E shows vertical dark and bright stripes. The inverses of the patterns shown in FIGS. 10B-10E are also representative of video in frame difference signal ΔF and are responded to.

A quaternary Hadamard's transforms circuit employs the following matrix $H_4$:

$$H_4 = \frac{1}{4}\begin{pmatrix} 1 & 1 & 1 & 1 \\ 1 & 1 & -1 & -1 \\ 1 & -1 & -1 & 1 \\ 1 & -1 & 1 & -1 \end{pmatrix} \quad (8)$$

The second to fourth rows of matrix $H_4$ in equation (8) are interchangeable.

Referring now to FIG. 11, there is shown an orthogonal transform (or retransform) circuit 98 (100) in the form of a Hadamard transform circuit. The undelayed frame difference signal $S_{i1}$ from serial/paralell converter 96 is applied to the plus inputs of adder 110 and subtractor 112. Signal $S_{i2}$, which has experienced a delay of one sampling interval T, is applied to the plus input of adder 110 and the minus input of subtractor 112. Signal $S_{i3}$, which has experienced a delay of one horizontal interval H, is applied to the plus inputs of an adder 114 and a subtractor 116. Signal $S_{i4}$, which has experienced a delay of one horizontal interval H plus one sampling interval T is applied to a plus input of adder 114 and the minus input of subtractor 116. The output of adder 110 is applied to the plus inputs of an adder 118 and a subtractor 120. The output of subtractor 112 is applied to the plus inputs of a subtractor 122 and an adder 124. The output of adder 114 is applied to a plus input of adder 118 and a minus input of subtractor 120. The output of subtractor 116 is applied to the minus input of subtractor 112 and a plus input of adder 124. The outputs $S''_{i1}$-$S''_{i4}$ of adder 118, subtractors 120 and 122 and adder 124 respectively are applied to non-linear circuit assembly 92. It will be clear that output $S''_{i1}$ represents the summation of inputs $S_{i1}$-$S_{i4}$ and thus provides a strong output in the presence of a video pattern such as shown in FIG. 10B. Similarly, output signal $S''_{i2}$ responds to a video pattern such as shown in FIG. 10C. Signals $S''_{i3}$ and $S''_{i4}$ are responsive to video patterns such as shown in FIGS. 10D and 10E respectively or the inverses thereof. According to the preceding, signals $S''_{i1}$-$S''_{i4}$ satisfy the following equations:

$$\left.\begin{array}{l} S''_{i1} = S_{i1} + S_{i2} + S_{i3} + S_{i4} \\ S''_{i2} = S_{i1} + S_{i2} - S_{i3} - S_{i4} \\ S''_{i3} = S_{i1} - S_{i2} - S_{i3} + S_{i4} \\ S''_{i4} = S_{i1} - S_{i2} + S_{i3} - S_{i4} \end{array}\right\} \quad (9)$$

Figure 12:
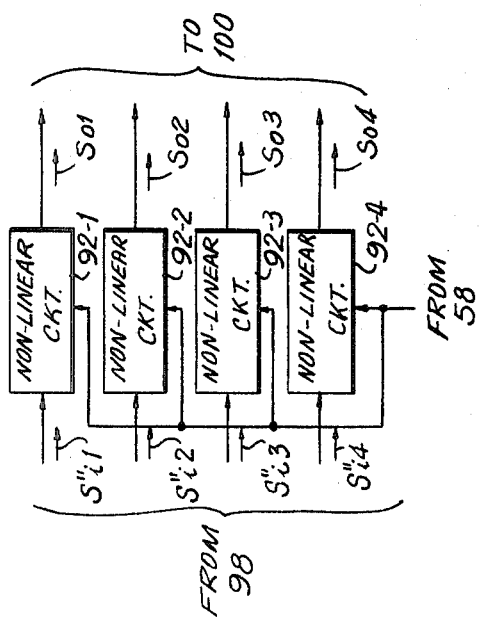
FIG. 12 is a block diagram of a non-linear circuit assembly suitable for use in the video suppression circuit of FIG. 8.

Referring now to FIG. 12, non-linear circuit assembly 92 is seen to receive signals $S''_{i1}$-$S''_{i4}$ in non-linear circuits 92-1 through 92-4 and to produce output signals $S_{01}$-$S_{04}$. As previously explained, a non-linear circuit 92-1 through 92-4 which receives a signal representative of video in frame difference signal $\Delta F$ suppresses the frequency component involved to produce a respective output $S_{01}$-$S_{04}$ which is substantially free of video and thus contains only the corresponding noise in frame difference signal $\Delta F$. Output signals $S_{01}$-$S_{04}$ are applied to orthogonal retransform circuit 100 where the frequency domain signals are reconverted to parallel time domain signals. As previously explained, orthogonal retransform circuit 100 is identical to orthogonal transform circuit 98 shown in FIG. 11 and described above. Therefore, a detailed description of orthogonal retransform circuit 100 is omitted. However, as shown by the parenthetical input and output signals in FIG. 11 representing the inputs and outputs of orthogonal retransform circuit 100, signals $S'_{i1}$-$S'_{i4}$ satisfy the following equations:

$$\left.\begin{array}{l} S'_{i1} = S_{01} + S_{02} + S_{03} + S_{04} \\ S'_{i2} = S_{01} + S_{02} - S_{03} - S_{04} \\ S'_{i3} = S_{01} - S_{02} - S_{03} + S_{04} \\ S'_{i4} = S_{01} - S_{02} + S_{03} - S_{04} \end{array}\right\} \quad (10)$$

Figure 13:
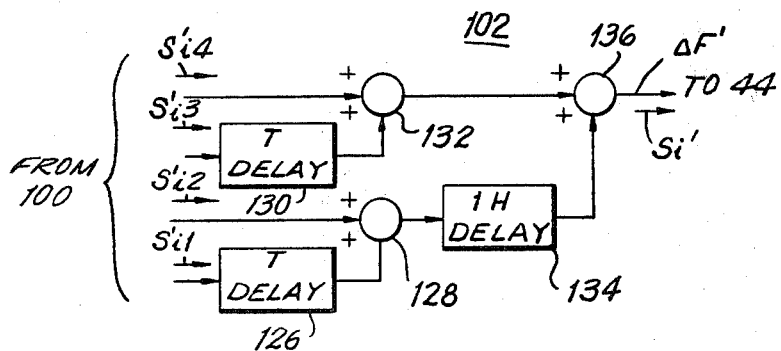
FIG. 13 is a parallel/series converter suitable for use in the video suppression circuit of FIG. 8.

Referring now to FIG. 13, there is shown an embodiment of a parallel/serial converter 102. Signal $S'_{i1}$, corresponding to signal $S_i$ (FIG. 9), with the video component removed, is applied to an input of a delay circuit 126 which has a delay of one sampling interval T. Signal $S'_{i2}$ is applied to a plus input of an adder 128. Signal $S'_{i3}$ is applied to an input of a delay circuit 130 which has a delay of one sampling interval T. Signal $S'_{i4}$ is applied to the plus input of an adder 132. The output of delay circuit 126 is applied to a plus input of adder 128. The output of adder 128 is applied to an input of delay circuit 134 which provides a delay of one horizontal interval H. The output of delay circuit 134 is applied to a plus input of an adder 136. The output of delay circuit 130 is applied to a plus input of adder 132. The output of adder 132 is applied to a plus input of adder 136. The output of adder 136 is the corrected frame difference signal $\Delta F'$ which is applied to subtractor 44 (FIG. 7). This signal, as previously described, contains substantially only the noise present in the incoming new video signal F and is thus subtracted from the new video signal to provide a noise-reduced video F' for display and storage.

Figure 14:
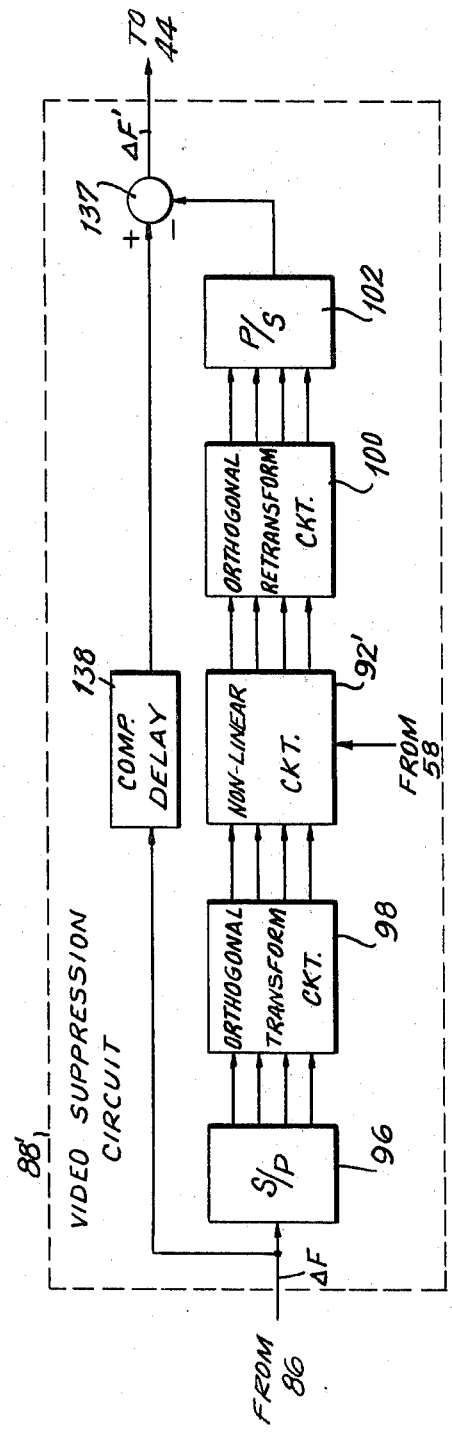
FIG. 14 is a block diagram of another embodiment of a video suppression circuit suitable for use in the embodiment of the invention shown in FIG. 7.
Figure 15:
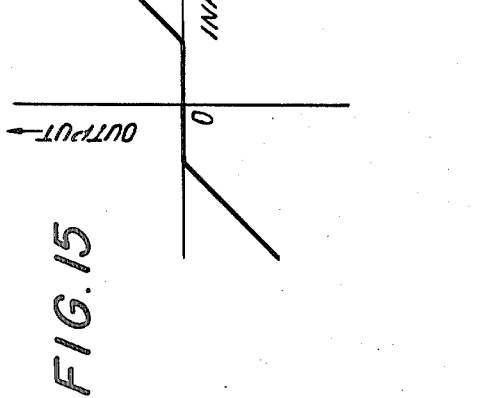
FIG. 15 is a graph showing the input and output relationships suitable for the non-linear circuit assembly of the video suppression circuit shown in FIG. 14.

Referring now to FIG. 14, there is shown another embodiment of a video suppression circuit 88'. Serial/parallel converter 96, orthogonal transform circuit 98, orthogonal retransform circuit 100 and parallel/serial converter 102 are identical to corresponding circuits in video suppression circuit 88 shown in FIG. 8 and will not be further described. Non-linear circuit assembly 92', contains a plurality of non-linear circuits, as shown in FIG. 12. Each of the non-linear circuits is a coring circuit which has a response characteristic such as shown in FIG. 15 wherein the output remains zero until a positive or negative threshold is exceeded whereupon the output responds linearly to the input. The output of parallel/serial converter 102 is applied to the minus input of a subtractor 137. Frame difference signal $\Delta F$ is also applied to a compensating delay circuit 138 which applies a delay to its input equal to the total signal delay in the other branch of the circuit and applies the delayed signal to a plus input of subtractor 137. Thus, the output of subtractor 137 linearly follows frame difference signal $\Delta F$ in the amplitude regions in which the outputs of non-linear circuit assembly 92' remain zero. As the amplitudes of input signals to non-linear circuit assembly 92' exceed the given threshold values, the outputs of parallel/serial converter 102 are increasingly subtracted from frame difference signal $\Delta F$ thus achieving a result similar to that previously described in which video components in frame difference signal $\Delta F$ are removed and the resulting corrected frame difference signal $\Delta F'$ is applied to subtractor 44 (FIG. 7).

Figure 16A:
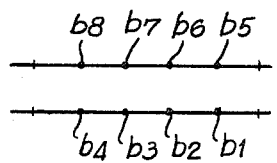
FIG. 16A is an enlarged view of two adjacent television lines showing four contiguous sampling points on each line whose video may be simultaneously provided for use with a video suppression circuit which evaluates the spatial pattern in an area consisting of the eight contiguous points.
Figure 16B:
FIGS. 16B–16I show the patterns which may be detected using the eight contiguous points shown in FIG. 16A.
Figure 16C:
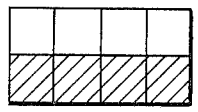
Figure 16D:
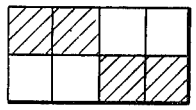
Figure 16E:
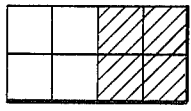
Figure 16F:
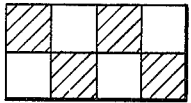
Figure 16G:
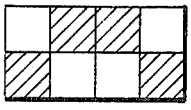
Figure 16H:
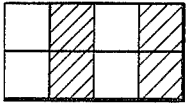
Figure 16I:
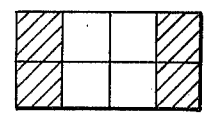

The illustrative embodiment described in the preceding uses a quaternary Hadamard transform to evaluate the spatial video pattern at four contiguous sampling points. Other sampling patterns are possible. For example, as shown in FIG. 16A, four contiguous picture elements $b_1$-$b_4$ in one line adjacent an additional four contiguous picture elements $b_5$-$b_8$ in the next line, may be analyzed for video content in the same manner as previously described. For such analysis, input signals $S_{i1}$-$S_{i8}$ are transformed into parallel components and their frequency content is analyzed using a Hadamard transform circuit to result in eight output signals $S''_{i1}$-$S''_{i8}$ given in the following:

$$\left.\begin{array}{l} S_{i1}'' = S_{i1} + S_{i2} + S_{i3} + S_{i4} + S_{i5} + S_{i6} + S_{i7} + S_{i8} \\ S_{i2}'' = S_{i1} + S_{i2} + S_{i3} + S_{i4} - S_{i5} - S_{i6} - S_{i7} - S_{i8} \\ S_{i3}'' = S_{i1} + S_{i2} - S_{i3} - S_{i4} - S_{i5} - S_{i6} + S_{i7} + S_{i8} \\ S_{i4}'' = S_{i1} + S_{i2} - S_{i3} - S_{i4} + S_{i5} + S_{i6} - S_{i7} - S_{i8} \\ S_{i5}'' = S_{i1} - S_{i2} + S_{i3} - S_{i4} - S_{i5} + S_{i6} - S_{i7} + S_{i8} \\ S_{i6}'' = S_{i1} - S_{i2} - S_{i3} + S_{i4} - S_{i5} + S_{i6} + S_{i7} - S_{i8} \\ S_{i7}'' = S_{i1} - S_{i2} + S_{i3} - S_{i4} + S_{i5} - S_{i6} + S_{i7} - S_{i8} \\ S_{i8}'' = S_{i1} - S_{i2} - S_{i3} + S_{i4} + S_{i5} - S_{i6} - S_{i7} + S_{i8} \end{array}\right\} \quad (11)$$

The patterns including their inverses which produce strong outputs on individual output lines are shown in FIGS. 16B-16I. Since a Hadamard transform circuit to produce signals corresponding to the spatial frequencies shown in FIGS. 16B-16I would be clear given the preceding disclosure herein, the details of the transform circuit are omitted.

The number of points which may be included for analysis of video content in frame difference signal $\Delta F$ is not limited to four or eight points. Larger numbers of points may be used depending on the availability of economical circuits to perform the described functions.

Referring now to FIG. 17, there is shown a video suppression circuit 88" including a signal transform circuit 90', which is slightly different from signal transform circuit 90 described in connection with FIG. 8. Signal transform circuit 90' performs both the serial/parallel conversion and Hadamard transform. Frame different signal $\Delta F$ from attenuator 86 (FIG. 7) is applied to an input of a vertical element averaging circuit 140 and the plus input of a subtractor 142. The output of vertical element averaging circuit 140 is applied to a minus input of subtractor 142, a plus input of subtractor 144 and an input of a horizontal element averaging circuit 146. The output of subtractor 142 is applied to a plus input of a subtractor 148 and an input of a horizontal element averaging circuit 150. The output of horizontal element averaging circuit 150 is applied to a minus input of subtractor 148 and to an input of non-linear circuit 92-2. The output of subtractor 148 is applied to an input of non-linear circuit 92-1. The output of horizontal element averaging circuit 146 is applied to a minus input of subtractor 144 an to an input of non-linear circuit 92-4. The output of subtractor 144 is applied to the input of non-linear circuit 92-3. The signals $S''_{i1}$-$S''_{i4}$ applied to non-linear circuits 92-1 through 92-4 respectively are the same as corresponding signals described in connection with video suppression circuit 88 in FIG. 8.

Vertical element averaging circuit 140 delays its input signal for one horizontal interval H, adds the delayed signal and the input signal and divides the result by two to produce a signal which represents the average of adjacent picture elements in two lines. Horizontal element averaging circuits 146 and 150 delay their respective input signals by one sampling interval T, add the delayed and undelayed components together and divide the result by two.

Non-linear circuit assembly 02 and signal recombination circuit 94 may be identical to those previously described and thus are not treated in detail.

The preceding embodiments have been described in connection with a system in which the noise is uniformly distributed across the spectrum, that is, white noise. Instead of white noise, the noise may vary in a known or predictable manner and the threshold values of individual non-linear circuits 92-1 through 92-N may be controlled in a manner which will shape the response of the circuit for best suppression of the video and enhancement of the noise.

Figure 18A:
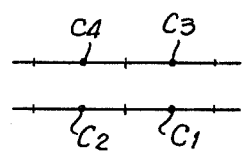
FIG. 18A is an enlarged view of adjacent television field lines showing a pair of non-contiguous points $C_1$ and $C_2$ on one field line as well as a second pair of non-contiguous points $C_3$ and $C_4$ on the other field line, the pair of points on each field line being separated by one unsampled sampling interval therebetween.
Figure 18B:
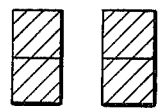
FIGS. 18B–18E show the video patterns detectable using the sampling points shown in FIG. 18A.
Figure 18C:
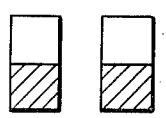

The noise reduction circuits described in the preceding paragraphs are effective to reduce the noise in monochrome or color television signals. A further improvement in reduction of noise in a color television signal is achievable when the luminance and chrominance signals therein are separated and separately processed to suppress the chrominance content as well as the luminance in frame difference signal $\Delta F$. The luminance component in frame difference signal $\Delta F$ is preferably suppressed using circuits such as shown in FIGS. 7 or 17. The chrominance component is preferably converted from serial to parallel signals as shown in FIG. 18A. As shown, points $c_1$ and $c_2$ are not contiguous on a television line, but instead are separated by a timing interval T. Similarly points $c_3$ and $c_4$ are separated by a sampling interval T and are respectively adjacent to points $c_1$ and $c_2$. As would be clear to one skilled in the art, such serial to parallel conversion may be accomplished using the apparatus of FIG. 9 in which the delay of delay circuits 106 and 108 is equal to two sampling intervals T.

Figure 18D:
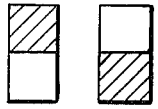
Figure 18E:
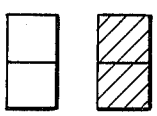

FIGS. 18B-18E show the possible video patterns and their inverses which are detectable using video from points $c_1$-$c_4$ of FIG. 18A. Detection of the pattern in FIG. 18D is especially valuable for sensing the presence of a chrominance component in a color television signal. It will be noted that the sampling rate is preferably four times the color subcarrier frequency. In addition, in the NTSC system, the phase of the color subcarrier is inverted from line to line. Thus, in the presence of a color subcarrier, the phase of this color subcarrier is inverted between points $c_1$ and $c_2$, $c_3$ and $c_4$, $c_1$ and $c_3$, and $c_2$ and $c_4$. The video pattern of FIG. 18D is ideally suited to detect such phase relationships. Thus, signal $S''_{i3}$ (FIG. 12) may be operated on by non-linear circuit 92-3 to produce a chrominance-free noise signal representing the noise present in the chrominance component. This signal may be separately subtracted from the frame difference signal $\Delta F$ in a subtractor, such as subtractor 44, in FIG. 7. The luminance portion of the signal may be operated on in the manner shown in FIGS. 7 or 17 to derive a noise-free luminance signal which may also be subtracted from the frame difference signal $\Delta F$ in subtractor 44 (FIG. 7).

Figure 19:
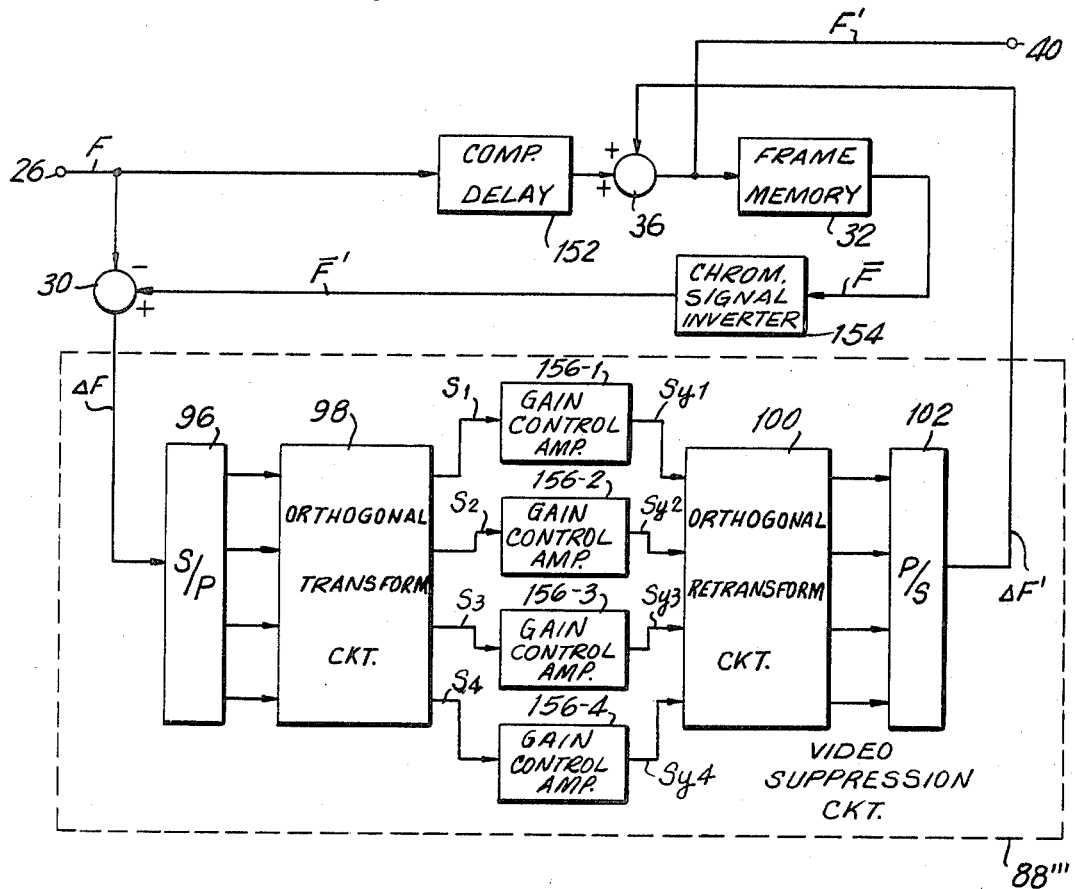
FIG. 19 is a block diagram of a noise reduction circuit according to the present invention, especially suitable for reducing the noise in a color television signal.

Referring now to FIG. 19, there is shown a further embodiment of the present invention which improves the noise reduction in a color television signal as well as eliminating the need for prediction filter 28 and area change detector 46 shown in other embodiments. The new video F from input terminal 26 is applied to the minus input of subtractor 30 and to an input of compensating delay circuit 152. Compensating delay circuit 152 compensates for unavoidable delays in a video suppression circuit 88'''. The output of compensating delay circuit 152 is applied to a plus input of adder 36. Corrected frame difference signal $\Delta F'$ generated in video suppression circuit 88''', to be described hereinafter, is applied to another plus input of adder 36. The summed signal from adder 36 is noise reduced video F' which is applied to output terminal 40 as well as to the input of frame memory 32.

The stored noise-reduced video $\overline{F}$ has its chrominance component inverted in chrominance signal inverter 154 to produce corrected stored video $\overline{F}'$ which is applied to the plus input of substractor 30. It should be noted that the output of subtractor 30 is stored video $\overline{F}'$ with its chrominance inverter minus the new video. Consequently, frame difference signal $\Delta F$ represents the negative of the noise in new video F. When frame difference signal $\Delta F$ is operated on by video suppression circuit 88''' to produce corrected frame difference signal $\Delta F'$, the resulting negative noise may be added to new video F in adder 36 to produce the net result of subtracting the noise component from new video F.

Figure 20:
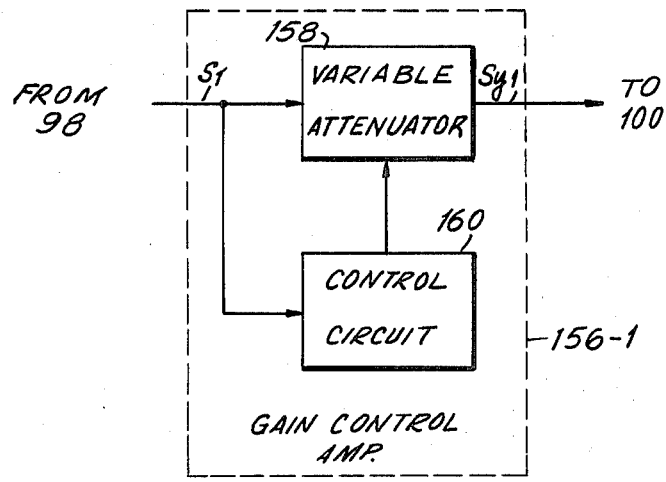
FIG. 20 is a block diagram of a gain control amplifier suitable for use in the embodiment shown in FIG. 19.

Video suppression circuit 88''' is identical to video suppression circuit 88 except for the substitution of gain control amplifiers 156-1 through 156-4 in place of non-linear circuit assembly 92 of FIG. 8. As shown in FIG. 20, each gain control amplifier, for example gain control amplifier 156-1, contains a variable attenuator 158 and a control circuit 160. Signal $S_1$ from orthogonal transform circuit 98 is applied in parallel to variable attenuator 158 and control circuit 160. Control circuit 160 applies a control signal to variable attenuator 158 in response to the amplitude of signal $S_1$ which attenuates the output $S_{y1}$ of variable attenuator 158 in response to increasing amplitude of input signal $S_1$.

Figure 21:
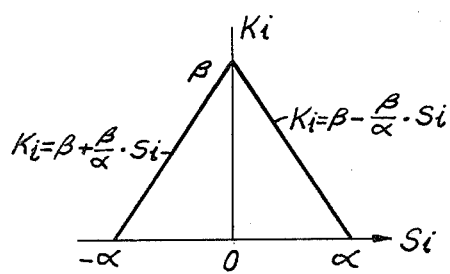
FIG. 21 is a graph showing the gain of the gain control amplifier of FIG. 20 versus the amplitude of the signal input.

Referring to FIG. 21, there is shown the gain of gain control amplifiers 156-1 through 156-N which satisfy the following equations:

$$K = \beta + \frac{\beta}{\alpha} \cdot S_i \, (-\alpha \leq S_i \leq 0)$$

-continued
$$K = \beta - \frac{\beta}{\alpha} \cdot S_i \, (0 \leq S_i \leq \alpha)$$

As input signal $S_i$ increases positively or negatively from zero, the gain of gain control amplifier 156-1 through 156-N decreases from a maximum value of $\beta$ for zero input signal $S_i$ to zero at the points where input signal $S_i$ equals plus or minus $\alpha$. Thus, the amplitude of output signals $S_{y1}$-$S_{y4}$ of gain control amplifiers 156-1 through 156-4 is represented by the following:

$$S_{yi} = \begin{cases} S_i \cdot (\beta + \frac{\beta}{\alpha} \cdot S_i) \, (-\alpha \leq S_i \leq 0) \\ S_i \cdot (\beta - \frac{\beta}{\alpha} \cdot S_i) \, (0 \leq S_i \leq \alpha) \end{cases}$$

Figure 22:
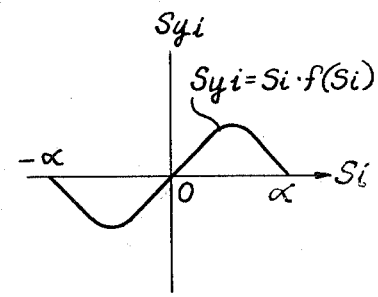
FIG. 22 is a graph showing the signal output verses signal input for the gain control amplifier of FIG. 20.

Thus, the input-output relationship of gain control amplifiers 156-1 through 156-4 is a quadratic function as shown in FIG. 22.

Due to the characteristics provided by gain control amplifiers 156-1 through 156-4, noise reduction in the video signal is independently controlled in response to input signals $S_1$-$S_4$ without the need for an external control signal such as from an area change detector 46 (FIG. 7). Thus, a simplified apparatus is possible.

Figure 23:
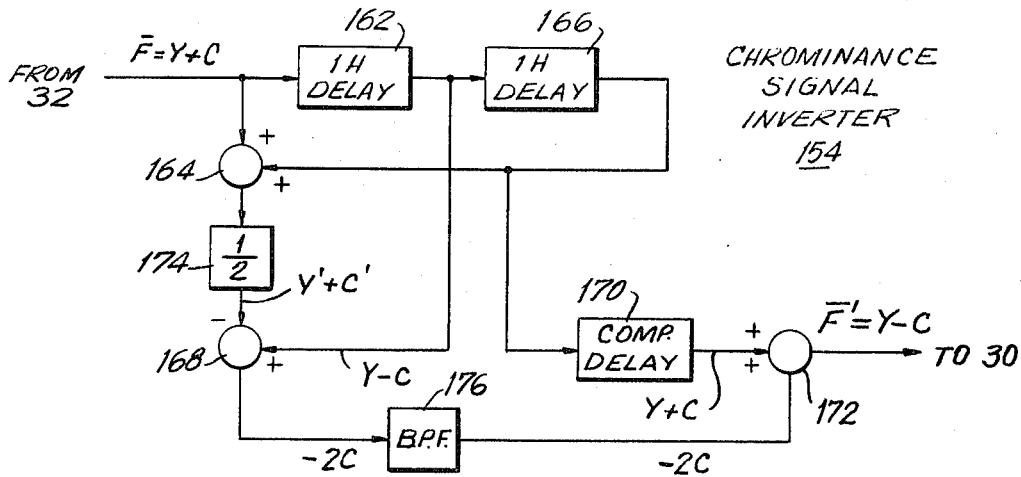
FIG. 23 is a block diagram of a chrominance signal inverter suitable for use in the embodiment of the invention shown in FIG. 19.

Referring now to FIG. 23, there is shown an embodiment of a chrominance signal inverter 154 which may be employed in the apparatus of FIG. 19. Stored video F, which contains a luminance component Y plus a chrominance component C is applied to an input of a delay circuit 162 having a delay of one horizontal interval H and to an input of an adder 164. The output of delay circuit 162 is applied to a delay circuit 166 also having a delay of one horizontal interval H and to a plus input of a subtractor 168. The output of delay circuit 166 is applied to an input of adder 164 and to an input of a compensating delay circuit 170. The output of compensating delay circuit 170 is applied to an input of an adder 172. The output of adder 164 has its amplitude divided by two in a divider 174 and the resulting signal is applied to the minus input of subtractor 168. The output of subtractor 168 is applied to an input of a band pass filter 176 which eliminates unwanted frequencies from the output of subtractor 168 and applies the resulting filtered signal to an input of adder 172.

Since the phase of the chrominance component C in stored video F reverses from line to line, the output of delay circuit 166, which has been delayed for two horizontal intervals H, includes a chrominace component C which has the same phase as the chrominance component C of stored video F. When stored video F and the output of delay circuit 166 are added in adder 164, the output thereof is a signal having twice the amplitude of stored video F. When this signal is divided by two in divider 174, the result is normalized to average video amplitude Y' plus C'. The output of delay circuit 162 includes a luminance component Y and an inverted chrominance component -C. When this signal is applied to subtractor 168, luminance component Y and average luminance component -Y cancel and the chrominance components C add negatively to produce a negative chrominance signal of twice the normal amplitude (-2C). When this is applied to adder 172, where it is added to signal Y plus C from delay circuit 166, a corrected stored video signal F' is obtained having a positive luminance component Y and a negative chrominance component -C. It will be understood that this places the chrominace component of both the new video F and the corrected stored video F' in the same phase and thus permits subtraction thereof in subtractor 30 for producing a frame difference signal $\Delta$ F which includes the subtraction of both the luminance component Y and the chrominance component C of the new video F and stored video F (FIG. 19).

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A noise reduction system for reducing noise in a video signal which consists of a plurality of successive frames occuring at frame intervals, comprising:
   means for storing at least one frame of said video signal for an integral multiple of said frame intervals;
   means for mixing corresponding elements of a new frame of said video signal with said video signal stored in said means for storing to produce a frame difference signal;
   means for transforming said frame difference signal into a plurality of video signal components;
   means for respectively controlling the plurality of video signal components whereby a predetermined characteristic of at least one of said plurality of video signal components is modified;
   means for recombining said plurality of video signal components including said at least one modified component into a corrected frame difference signal; and
   means for combining said corrected frame difference signal with said new frame of said video signal to obtain a noise-reduced video signal.

2. A noise reduction system according to claim 1; wherein said means for storing includes a frame memory operative to store at least one of said plurality of successive frames.

3. A noise reduction system according to claim 2; further comprising means for feeding a proportional mixture of said noise-reduced video signal and said new frame of said video signal to said frame memory for storage therein.

4. A noise reduction system according to claim 3; further comprising means for detecting frame-to-frame change in at least one area of said plurality of frames, and control means for controlling the proportion of said mixture in response to said frame-to-frame change.

5. A noise reduction system according to claim 4; wherein said means for controlling said plurality of video signal components is responsive to said means for detecting frame-to-frame change whereby the amount by which said predetermined characteristic is modified is varied in response to the amount of said frame-to-frame change.

6. A noise reduction system according to claim 4; wherein said means for detecting frame-to-frame change includes area summer means for summing said frame difference signals corresponding to said one area of said plurality of frames.

7. A noise reduction system according to claim 6; wherein said means for detecting frame-to-frame change includes a first area summer operative to produce a first smoothed signal which includes a sum of said frame difference signal in said area, an absolute value circuit for producing an absolute value signal responsive to an absolute value of said first smoothed signal, and a second area summer operative to further smooth said absolute value signal.

8. A noise reduction system according to claim 1; wherein said video signal includes a chrominance component and a luminance component, and said system further comprises means for inverting said chrominance component of said video signal from said means for storing.

9. A noise reduction system according to claim 1; wherein said means for transforming includes serial to parallel conversion means for converting at least a plurality of portions of said frame difference signal into a parallel plurality of signals, and means for orthogonally transforming said parallel plurality of signals into said plurality of video signal components.

10. A noise reduction system according to claim 9; wherein said means for respectively controlling the plurality of video signal components includes at least one non-linear means.

11. A noise reduction system according to claim 10; wherein said at least one non-linear means includes at least one limiter circuit.

12. A noise reduction system according to claim 10; wherein said at least one non-linear means includes at least one coring circuit.

13. A noise reduction system according to claim 10; wherein said at least one non-linear means includes at least one stripping circuit.

14. A noise reduction system according to claim 10; wherein said means for orthogonally transforming includes a Hadamard transform circuit.

15. A noise reduction system according to claim 14; wherein said means for recombining includes a second Hadamard transform circuit.

16. A noise reduction system according to claim 15; wherein said means for recombining further includes means for effecting parallel to serial conversion of an output of said second Hadamard transform circuit.

17. A noise reduction system according to claim 10; further comprising means for detecting frame-to-frame change in said video signal and means for controlling said at least one non-linear means in response to the detected change.

18. A noise reduction system according to claim 9; wherein said means for respectively controlling includes a gain control amplifier having a gain which is inversely proportional to signal strength of at least part of said plurality of video signal components.

19. A noise reduction system according to claim 9; wherein said video signal includes at least first and second adjacent horizontal video lines, said serial to parallel conversion means being effective to provide at least first and second video samples from first and second positions on said first line and at least third and fourth video samples from third and fourth positions on said second video line, said first and third positions and said second and fourth positions being adjacent each other.

20. A noise reduction system according to claim 19; wherein said first and second positions and said third and fourth positions are contiguous.

21. A noise reduction system according to claim 19; wherein said video signal is a digitized video signal which has been sampled at a sampling interval which occurs at four times the frequency of a television color signal subcarrier, said first and second and said third and fourth video samples being taken from non-contiguous sampling intervals which are separated by one sampling interval.

22. A noise reduction system according to claim 1; wherein said means for transforming, means for respectively controlling and means for recombining form means for suppressing video in said frame difference signal whereby said corrected frame difference signal contains substantially only noise corresponding to noise on said new frame.

23. A noise reduction system according to claim 1; wherein said video signal includes a luminance component and a chrominance component and said system further comprises means for separating said luminance component and said chrominance component, said means for mixing being effective to produce separate luminance and chrominance frame difference signals, said means for transforming, means for respectively controlling and means for recombining being respectively effective to separately operate on said luminance and chrominance components to produce corrected chrominance and corrected luminance frame difference signals, and said means for combining being effective to combine said corrected chrominance and corrected luminance frame difference signals with said new frame of said video signal to obtain said noise-reduced video signal.

24. A noise reduction system according to claim 1; wherein said means for mixing includes a subtractor.

25. A noise reduction system according to claim 1; wherein said means for combining includes a subtractor.

26. A noise reduction system for reducing noise in a video signal which consists of a plurality of successive frames occurring at frame intervals, comprising:
  a frame memory operative to store at least one of said frames;
  a means for producing a frame difference signal responsive to element-by-element difference between corresponding elements of a new frame and a frame stored in said frame memory;
  an area change detector responsive to said frame difference signal for producing a change signal responsive to frame-to-frame change in an area of said video signal near said elements to which said means for producing a frame difference signal are responsive;
  a video suppression circuit including a signal transform circuit, a non-linear circuit assembly and a signal recombination circuit;
  said signal transform circuit including means for producing a parallel plurality of orthogonally transformed signal components of said frame difference signal;
  said non-linear circuit assembly including a plurality of non-linear circuits, each of said plurality of non-linear circuits being responsive to said change signal to control the passage therethrough of one of said parallel plurality of orthogonally transformed signal components whereby change-induced components are removed therefrom;
  said signal recombination circuit including means for orthogonally retransforming said parallel plurality of orthogonally transformed signal components from said non-linear circuit assembly into a serial corrected frame difference signal corresponding to said frame difference signal with said change-induced components removed;

a subtractor for subtracting said correct frame difference signal from said new frame whereby a noise-reduced video signal is produced; and proportioning means responsive to said change signal for feeding a proportional mixture of said new frame and said noise reduced video signal to said frame memory for storage therein.

27. A noise reduction system for reducing noise in a video signal which consists of a plurality of successive frames occurring at frame intervals, comprising:

a frame memory operative to store at least one of said frames;

means for producing a frame difference signal responsive to element-by-element differences between corresponding elements of a new frame and a frame stored in said frame memory;

a video suppression circuit including a signal transform circuit, a plurality of gain control amplifiers and a signal recombination circuit;

said signal transform circuit including means for producing a parallel plurality of orthogonally transformed signal components of said frame difference signal;

each of said plurality of gain control amplifiers being operative to control the passage therethrough of one of said parallel plurality of orthogonally transformed signal components whereby change-induced components are removed therefrom;

said signal recombination circuit including means for orthogonally retransforming said parallel plurality of orthogonally transformed signal components from said plurality of gain control amplifiers into a serial corrected frame difference signal corresponding to said frame difference signal with said change-induced components removed;

mixing means for mixing said corrected frame difference signal with said new frame whereby a noise-reduced video signal is produced; and said frame memory being operative to store said noise-reduced video signal.

28. A noise reduction system according to claim 27; wherein said video signal includes a chrominance component and a luminance component, and said system further comprises means for inverting said chrominance component of said frame stored in said frame memory before said frame difference signal is produced.

* * * * *